(12) United States Patent
Akamatsu

(10) Patent No.: US 6,691,568 B2
(45) Date of Patent: *Feb. 17, 2004

(54) AIR METER

(75) Inventor: Masuo Akamatsu, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/765,400

(22) Filed: Jan. 22, 2001

(65) Prior Publication Data

US 2001/0009109 A1 Jul. 26, 2001

(30) Foreign Application Priority Data

Jan. 21, 2000 (JP) ........................................ 2000-013370

(51) Int. Cl.$^7$ ................................................ G01F 1/68
(52) U.S. Cl. ................................................ 73/204.17
(58) Field of Search .................. 73/204.17, 204.15, 73/204.23, 204.25

(56) References Cited

U.S. PATENT DOCUMENTS 6,032,526 A * 3/2000 Akamatsu ................. 73/204.17

FOREIGN PATENT DOCUMENTS

| DE | 19629747 | 1/1998 |
|---|---|---|
| DE | 19818315 | 9/1999 |
| JP | 05-010797 | 1/1993 |
| JP | 05-157602 | 6/1993 |
| JP | 08-247815 | 9/1996 |
| JP | 10-148556 | 6/1998 |

* cited by examiner

Primary Examiner—Edward Lefkowitz
Assistant Examiner—Jewel V. Thompson
(74) Attorney, Agent, or Firm—Crowell & Moring LLP

(57) ABSTRACT

An air meter is provided which enables the improvement of accuracy of internal reference voltages with few IC terminals. A band gap reference power supply circuit 6 supplies an internal reference voltage to a characteristic adjusting circuit 4 and an internal reference voltage VINT to a multiplier circuit 5. the band gap reference power supply circuit 6 comprises a temperature current generating circuit 21 for generating a current proportional to a temperature, a current mirror circuit for duplicating the current of the temperature current generating circuit 21, a reference voltage generating circuit 23 through which the current duplicated by the current mirror circuit 22 is caused to be flowed to generate the internal reference voltage ES, and a reference voltage generating circuit 24 through which the current duplicated by the current mirror circuit 22 is caused to be flowed to generate the internal reference voltage VINT.

2 Claims, 3 Drawing Sheets

AIR METER

BACKGROUND OF THE INVENTION

This invention relates to an air meter, particularly to an air meter for measuring air mass flow suitable for the use of engine control for an automobile.

As the prior art air meter, a ratio-metric output type air meter is known having an output characteristic adjusting circuit and a ratio-metric converting circuit, as shown in Japanese Patent Prepublication No. 148556/1998. Also, in a frequency output type air meter, a ratio-metric output type air meter is known having an output characteristic adjusting circuit and a voltage controlled oscillator circuit.

However, in both of the ratio-metric output type air meter and the frequency output type air meter, two circuits of the respective air meters have independent internal reference power supply circuits, and to assure their accuracy it is necessary that a resistor is connected to the external of a monolithic IC, and therefore, it is necessary that the IC has connection terminals of the number proportional to the number of the internal reference power supply circuit outputs.

SUMMARY OF THE INVENTION

An object of this invention is to provide an air meter in which in case where a plurality of internal reference power supply circuits are needed, it is possible to improve the accuracy of the internal reference voltage with fewer IC terminals.

The above-mentioned and other objects of this invention can be attained by an air meter having a characteristic adjusting circuit for adjusting the characteristic of a flow rate signal detected by flow rate detecting means, by using a first internal reference voltage, and outputting the flow rate characteristic signal, a conversion circuit for converting the flow rate characteristic signal which this characteristic adjusting circuit outputs, to a ratio-metric output or a frequency output on the basis of a second internal reference voltage, and a reference power supply circuit for said first and second internal reference voltages, said internal reference power supply circuit comprising: a temperature current generating circuit for generating a current proportional to a temperature; a current mirror circuit for deprecating the current of this temperature current generating circuit; a first reference voltage generating circuit for flowing the current duplicated by this current mirror circuit and generating said first reference voltage; and a second reference voltage generating circuit for flowing another current duplicated said current mirror circuit and generating said second reference voltage.

With this arrangement, it is possible to improve the precision of the internal reference voltages with few terminal of IC.

In accord with another aspect of this invention, preferably said temperature current generating circuit uses as a resistor a thick-film resistor, and said first and second reference voltage generating circuits use a monolithic resistor and a thick-film resistor, respectively.

With this arrangement, it is possible to correct the linearity of the temperature characteristics of the reference voltages.

DETAILED DESCRIPTION OF THE PREFERRED EMBODIMENTS

Figure 1:
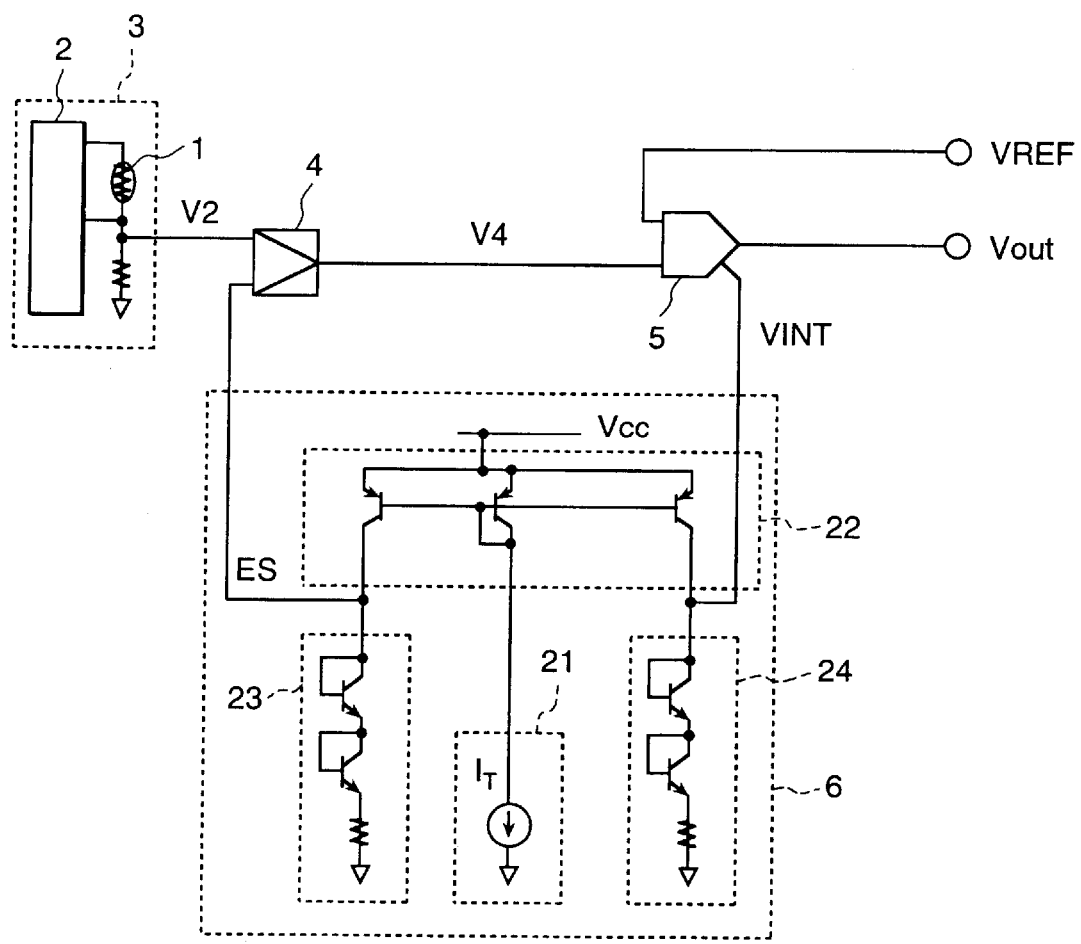
FIG. 1 is a circuit diagram of an air meter according to a first embodiment of this invention.

Hereinafter, the arrangement of an air meter according to a first embodiment of this invention will be explained using FIG. 1. The explanation is given by exemplifying a ratio-metric output type air meter.

A flow rate detecting circuit 3 comprises a heat generating resistor 1 positioned in an air flowing path, and a constant temperature controlling circuit 2. The heat generating resistor 1 receives a current from the constant temperature controlling circuit 2, and is heat-controlled by self heat generation. The constant temperature controlling circuit 2 detects an air flow rate from the magnitude of heat current by controlling the heat current to maintain the resistance of the heat generating resistor 1 to a predetermined value, and generates a flow rate detection signal V2.

An output characteristic adjusting circuit 4 adjusts the characteristic of the flow rate detection signal V2 by adjusting a zero point and an amplification factor on the basis of Equation (1), thereby to generate a flow rate characteristic signal V4 by adjusting the output signal of the air meter to a predetermined characteristic. In order to adjust the zero point of the output characteristic adjusting circuit 4, an internal reference voltage ES generated by a band gap reference power supply circuit 6 is used.

$$V4 = K1 \times V2 - K2 \times ES \tag{1}$$

In this Equation (1), K1 is a constant for adjusting the amplification factor and K2 is a constant for adjusting the zero point.

A multiplication circuit 5 constituting a ratio-metric conversion circuit compares the internal reference voltage VINT generated by the band gap reference power supply circuit 6 with an external reference voltage VREF supplied from an engine control unit connected to the air meter, and converts the flow rate characteristic signal V4 created by the output characteristic adjusting circuit 4 to a ratio-metric characteristic on the basis of Equation (2), thereby to output an output signal VOUT from the air meter.

$$VOUT = K3 \times V4 \times (VREF/VINT) \tag{2}$$

In this Equation (2), K3 is a constant.

The engine control unit not shown in the drawings includes an AD converter for converting the signal of the air meter to a digital signal to control the engine using the signal of the air meter.

Now, Equation (2) can be expressed as following Equation (3) using Equation (1).

$$VOUT = (K1 \times V2 - K2 \times FS) \times K3 \times (VREF/VINT) \tag{3}$$

From Equation (3), it is clear that since the internal reference power supply voltage ES causes the zero point to change and the internal reference voltage VINT causes the amplification factor to change, the internal reference power supply voltage ES and the internal reference voltage VINT are, if they are of independent characteristics, suitable to adjust the temperature characteristic of the air meter.

Therefore, in this embodiment, a semiconductor integrated circuit is effectively arranged by using a band gap reference power supply circuit 6 as means for generating the internal reference voltages ES and VINT.

Since any dispersion of the band gap reference power supply circuit 6 depends upon the dispersion of the transistors and resistors constituting it, the use of external resistors such as thick-film resistors formed on a circuit substrate on which an IC is mounted is suitable rather than the use of monolithic resistors integrated within an IC, because the dispersion of resistances and voltages is small. However, the former produces the problem that the number of terminals of the IC for connecting the transistors within the IC to the external resistors is increased.

Accordingly, in the band gap reference power supply circuit 6 according to this embodiment, a temperature current IT of which current value is proportional to the absolute temperature is generated by a temperature current generating circuit 21, and two internal reference voltages ES and VINT are generated by supplying temperature currents duplicated by a current duplicating circuit 22 to a reference voltage generating circuit 22 and a reference voltage generating circuit 24.

The reference voltage generating circuits 23 and 24 each comprises respective diodes or transistors and a respective resistor as shown in the drawing. In these arrangement, since the temperature characteristic of the forward voltage-drop voltage VF of the diode connection is negative with respect to temperature change, if it is added to the voltage drop of the resistor through which the current proportional to a temperature is flowed, it is possible to counterbalance any temperature change. Thus, it is possible to generate a reference voltage of which value does not change even though there is any change of temperature.

As explained above, in this embodiment, it is possible to provide a plurality of high precision band gap reference power supply circuit of which characteristic can be set up independently, with few IC terminals, rather than two integrated reference power supply circuits.

Next, the arrangement of an air flow rate meter according to the second embodiment of this invention will be explained. This embodiment will be explained using the example of a ratio-metric output type air flow rate meter.

Figure 2:
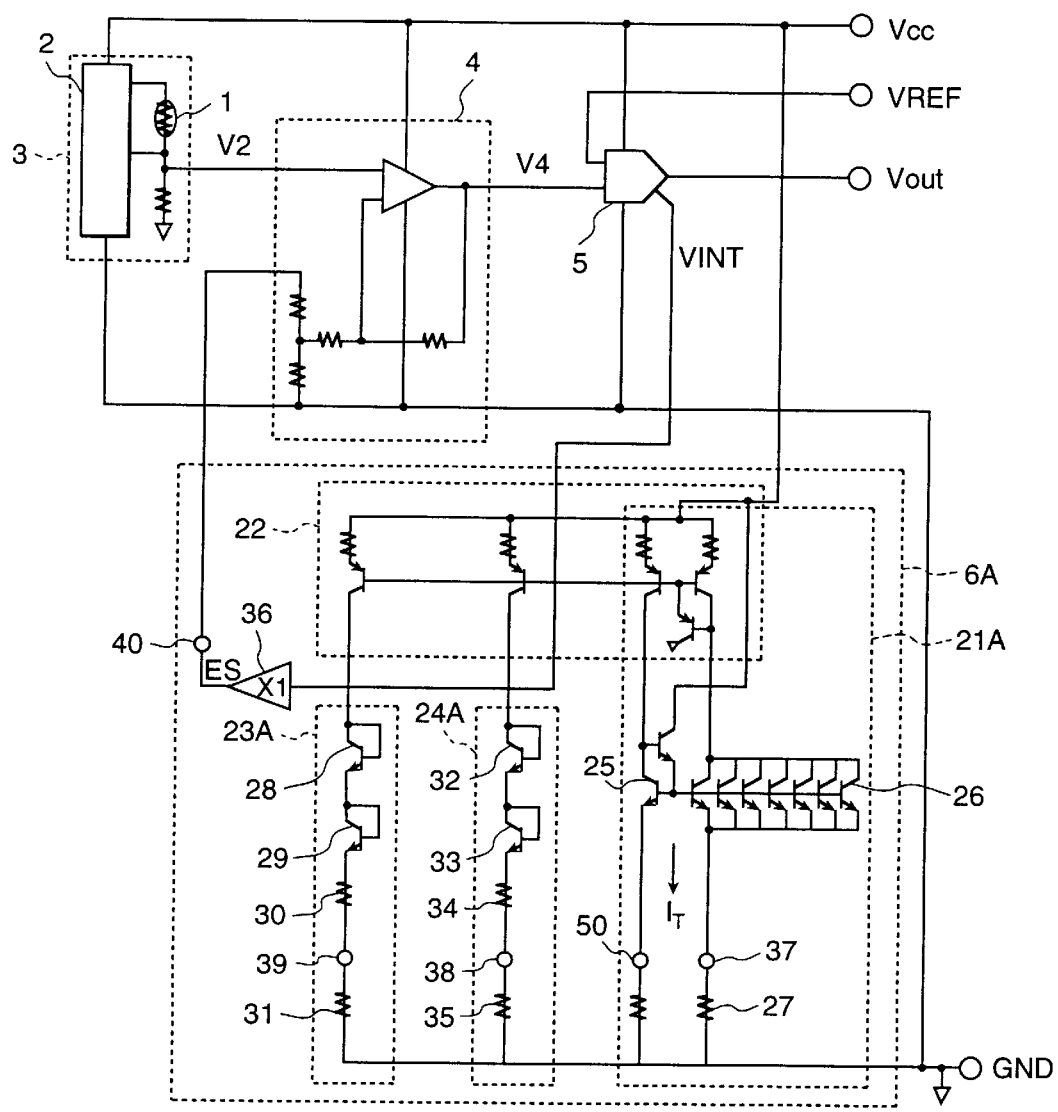
FIG. 2 is a circuit diagram of an air meter according to a second embodiment of this invention.

FIG. 2 is a circuit diagram showing the arrangement of the air flow rate meter according to the second embodiment of this invention. Incidentally, the same reference numerals as those in FIG. 1 indicate the same parts or components.

In FIG. 2, a flow rate detecting circuit 3, an output characteristic adjusting circuit 4 and a multiplier circuit 5 are the same as the corresponding ones in FIG. 1.

A band gap reference circuit 6A comprises a temperature current generating circuit 21A, a current duplicating circuit 22, a reference voltage generating circuit 23A and a reference voltage generating circuit 24A.

The temperature current generating circuit 21A is made up transistors 25 and 26. The emitter of the transistor 25 is connected to a terminal 50, and the emitters of the transistors 26 is connected to a terminal 37. To these terminals, temperature currents IT of which values are proportional to the absolute temperature are supplied. The terminal 37 is connected to an external resistor 27 such as a thick-film resistor, and the terminal 50 is connected to the external ground potential. The current duplicating circuit 22 is the same as the corresponding one of the FIG. 1.

The reference voltage generating circuit 23A comprises series-connected transistors 28 and 29, and resistors 30 and 31. The resistors 30 and 31 are connected to a terminal 39 for connecting thereto an external resistor. The resistor 30 is a monolithic resistor and the resistor 31 is a thick-film resistor which is the external resistor. The reference voltage generating circuit 23A has the output which is connected to an external connection terminal 40 through a voltage follower 36 to supply the reference voltage ES to the output characteristic adjusting circuit 4. Also, the reference voltage generating circuit 24A comprises series-connected transistors 32 and 33 and resistors 34 and 36 of which interconnections act as a terminal 38 to which an external resistor is connected. The resistor 34 is a monolithic resistor and the resistor 36 is a thick-film resistor which is the external resistor.

The band gap reference circuit 6A has the almost components housed within an IC and has four terminals 37, 38, 39 and 50 to which external resistors such as thick-film resistors are connected. Therefore, it is possible to use as the resistors as used in the reference voltage generating circuits 23A and 24A the combination of the external thick-film and inside IC monolithic resistors, and to correct the linearity of the temperature characteristic of the reference voltage. In the arrangement in FIG. 2, since it is possible to set up independently the amounts of correction for the linearity of the reference voltages ES and VINT with the ratio of the monolithic resistor 30 and the external resistor 31 and the ratio of the monolithic resistor 34 and the external resistor 35, the zero point of the air meter and the temperature of the span as well as the temperature characteristic linearity of the zero point and the temperature characteristic linearity of the span, respectively, can be adjusted to their respective optimum values.

Also, in the example shown in FIG. 2, since the internal of the IC and the terminal for providing the connection to the external resistors are connected using few number of terminals such as four terminals 37, 38, 39 and 50, it is possible to decrease the number of the IC connection terminal, and assure the accuracy of the band gap reference power supply circuit.

Next, the arrangement of an air meter according to the third embodiment of this invention will be explained using FIG. 3. This embodiment will be explained using a frequency output type air flow rate meter.

Figure 3:
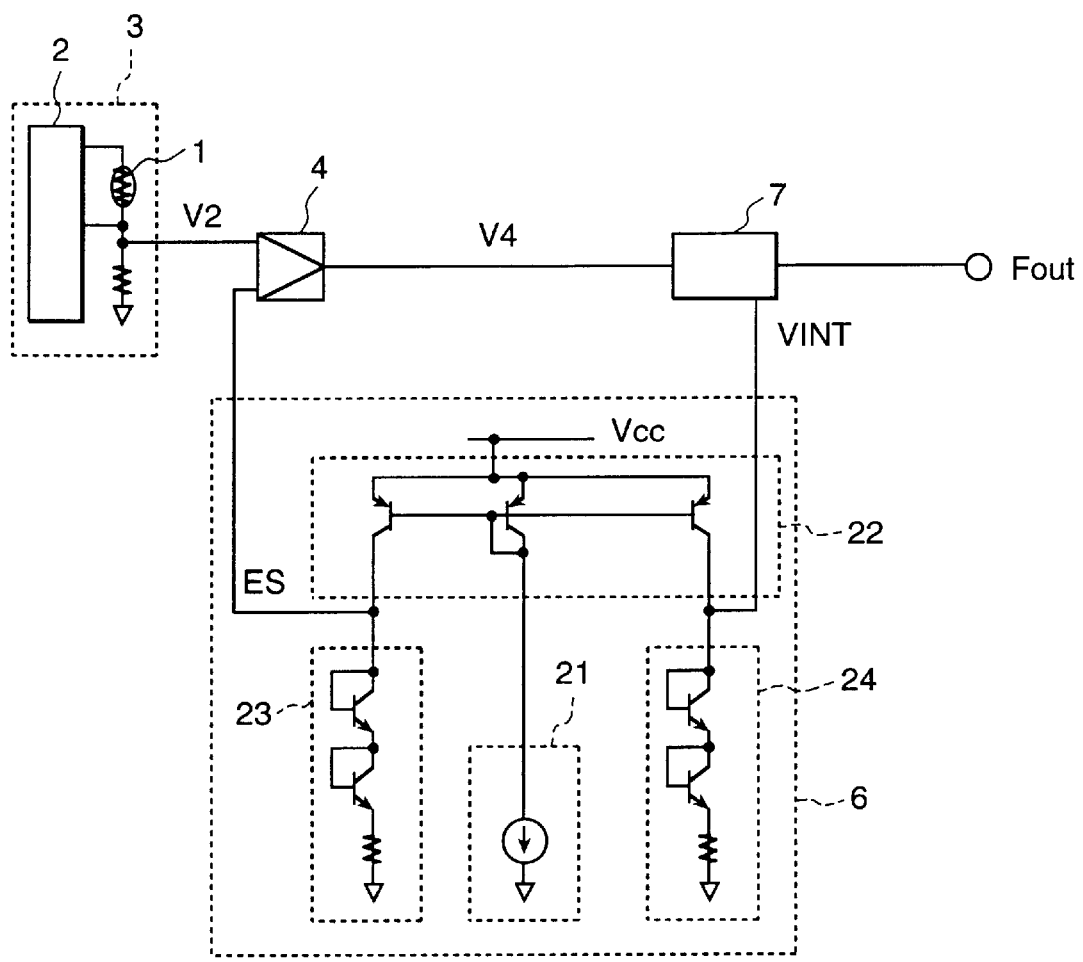
FIG. 3 is a circuit diagram of an air meter according to a third embodiment of this invention.

FIG. 3 is a circuit diagram showing the arrangement of the air flow rate meter according to the third embodiment of this invention. The reference numerals as used which are the same as those in FIG. 1 identify the same parts or components.

In FIG. 3, a flow rate detecting circuit 3 and an output characteristic adjusting circuit 4 are the same as the corresponding ones of FIG. 1. The multiplier circuit 5 as used in FIG. 1 is replaced with a VCO (voltage controlled oscillator) circuit 7. The VCO circuit 7 converts the output voltage signal V4 of the output characteristic adjusting circuit 4 to a frequency signal, and generates the output signal VOUT of the frequency output type air flow rate meter.

The band gap reference power supply circuit 6 generates an internal reference voltage ES for the output characteristic adjusting circuit 4 and an internal reference voltage VINT for the VCO circuit 7. Just like the case of FIG. 1, the band gap reference power supply circuit 6 comprises a temperature current generating circuit 21, a current duplicating circuit 22 and reference voltage generating circuits 23 and 24. The temperature current generating circuit 21 generates an temperature current IT of which value is proportional to the absolute temperature, and generates two internal reference voltages ES and VINT by supplying temperature currents duplicated by using the current duplicating circuit 22 to the reference voltage generating circuit 23 and the reference voltage generating circuit 24, respectively.

The reference voltage generating circuits 23 and 24 each is made up two diodes or transistors and a resistor as shown in the drawing. Since the temperature characteristic of the forward voltage-drop voltage of the diode connection is negative with respect to any temperature change, if the voltage drop due to the resistor through which the current proportional to the temperature is flowed is added to it, it is possible to cancel any temperature change and to generate a reference voltage of which value does not change depending upon the temperature change, using a selected resistor.

As explained above, in this embodiment, it is possible to provide a plurality of high precision band gap reference power supply circuit of which characteristic can be set up independently, with few IC terminals, rather than two integrated reference power supply circuits.

In accordance with this invention, in an air meter in which a plurality of internal reference power supply circuits are needed, it is possible to improve the degree of accuracy of an internal reference voltage with few IC terminals.

What is claimed is:

1. An air-flow meter having first and second internal reference voltages, comprising:

a temperature current generating circuit for generating a current proportional to a temperature;

a current mirror circuit for deprecating the current of temperature current generating circuit;

a first reference voltage generating circuit for flowing the current duplicated by said current mirror circuit and generating said first interal reference voltage; and a second reference voltage generating circuit for flowing another current duplicated by said current mirror circuit and generating said second interal reference voltage.

2. An air meter according to claim 1 wherein said temperature current generating circuit uses a thick-film resistor as a resistor constituting said temperature current generating circuit, and said first and second reference voltage generating circuits use a monolithic resistor and a thick-film resistor, respectively.

* * * * *